United States Patent
Ueda (10) Patent No.: US 10,237,522 B2
(45) Date of Patent: Mar. 19, 2019

(54) COOLING DEVICE, LIGHT SOURCE UNIT AND PROJECTOR

(71) Applicant: CASIO COMPUTER CO., LTD., Shibuya-ku, Tokyo (JP)

(72) Inventor: Tomoyuki Ueda, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/883,402

(22) Filed: Jan. 30, 2018

(65) Prior Publication Data

US 2018/0270456 A1    Sep. 20, 2018

(30) Foreign Application Priority Data

Mar. 16, 2017  (JP) ................. 2017-051314

(51) Int. Cl.
*G03B 21/16*   (2006.01)
*H04N 9/31*    (2006.01)
*H04N 5/74*    (2006.01)
*G03B 21/20*   (2006.01)

(52) U.S. Cl.
CPC ........... *H04N 9/3144* (2013.01); *G03B 21/16* (2013.01); *G03B 21/206* (2013.01); *G03B 21/2013* (2013.01); *H04N 5/7458* (2013.01)

(58) Field of Classification Search
CPC ...... G03B 21/16; G03B 21/18; G03B 21/145; H04N 9/3141; H04N 9/3144; F21V 29/02; F21V 29/60; F21V 29/67
See application file for complete search history.

(56) References Cited

U.S. PATENT DOCUMENTS

| | | | |
|---|---|---|---|
| 9,625,798 B2 | 4/2017 | Kase | |
| 2008/0156461 A1* | 7/2008 | Otsuki | F04D 29/582 165/80.3 |
| 2011/0114296 A1* | 5/2011 | Horng | H01L 23/467 165/104.34 |
| 2012/0162912 A1* | 6/2012 | Kim | H05K 7/20909 361/692 |
| 2014/0240679 A1* | 8/2014 | Nishimori | G03B 21/2013 353/52 |
| 2015/0342091 A1* | 11/2015 | Scharinger | H05K 7/20909 165/80.3 |
| 2016/0077414 A1* | 3/2016 | Nishiyama | H04N 9/3111 348/748 |

FOREIGN PATENT DOCUMENTS

JP    2015222301 A   12/2015

* cited by examiner

*Primary Examiner* — Sultan Chowdhury
(74) *Attorney, Agent, or Firm* — Holtz, Holtz & Volek PC (57) ABSTRACT

A cooling device according to an embodiment of the invention includes an axial-flow fan and a heat sink having a fin assembly in which a recess portion is formed on a side thereof which faces the axial-flow fan to thereby provide a cooling device in which a space necessary for cooling is reduced, a light source unit including the cooling device and a projector including the light source unit.

21 Claims, 7 Drawing Sheets

COOLING DEVICE, LIGHT SOURCE UNIT AND PROJECTOR

CROSS-REFERENCE TO RELATED APPLICATION

This application is based upon and claims the benefit of priority under 35 USC 119 from Japanese Patent Application No. 2017-051314 filed on Mar. 16, 2017, the entire disclosure of which, including the description, claims, drawings and abstract, is incorporated herein by reference.

BACKGROUND OF THE INVENTION

Field of the Invention

The present invention relates to a cooling device, alight source unit including this cooling device, and a projector including this light source unit.

Description of the Related Art

In these days, data projectors are widely used on many occasions as an image projector for projecting a screen or a video screen of a personal computer and images based on image data recorded on a memory card or the like. In these data projectors, light emitted from a light source is collected on a micromirror display device called a Digital Micromirror Device (DMD) or a liquid crystal panel, so that a color image is displayed on a screen.

The projectors include a light source unit, and the light source unit is heated when it generates light for emission. Thus, an interior of the light unit is cooled by a cooling device.

For example, a light source unit described in Japanese Unexamined Patent Application Publication No. 2015-222301 includes a first heat sink for a first light source which is disposed on aside of the first light source, a second heat sink for a second light source which is disposed on a side of the second light source, and a first cooling fan which is made up of an axial-flow type blower and which is disposed between the first heat sink and the second heat sink so as to be parallel thereto.

It is known that an air flow speed and an air flow amount of such an axial-flow fan are quickly and drastically reduced in such a state that the axial-flow fan is disposed so that an intake side thereof is situated near, for example, a wall surface or the like. Due to this, in a so-called draw cooling method in which a heat sink is disposed on an intake port side of a cooling fan, when attempting to drive the cooling fan efficiently, a certain distance needs to be ensured between an intake port of the cooling fan and the heat sink.

In a case where the certain distance is ensured between the cooling fan and the heat sink, however, a dead space is increased, and a limitation is imposed on the layout of the cooling fan and the heat sink. This causes a problem in that it is difficult to reduce the size of a main body of the projector while ensuring the required cooling performance of the projector.

SUMMARY OF THE INVENTION

The invention has been made in view of the problem described above, and an object thereof is to provide a cooling device having a reduced space necessary for cooling, a light source unit including the cooling device, and a projector including the light source unit.

According to a first aspect of the invention, there is provided a cooling device including an axial-flow fan and a heat sink having a fin assembly having a recess portion formed on a side thereof which faces the axial-flow fan.

According to a second aspect of the invention, there is provided a light source unit including the cooling fan according to the first aspect and a light source which is connected to the heat sink according to the first aspect.

According to a third aspect of the invention, there is provided a projector including the light source unit according to the second aspect, a display device on which light source light from the light source unit is shone to form image light, a projection side optical system configured to project the image light emitted from the display device on to a screen, and a control unit configured to control the display device and the light source unit.

DETAILED DESCRIPTION OF THE PREFERRED EMBODIMENT (First Embodiment)

Figure 1:
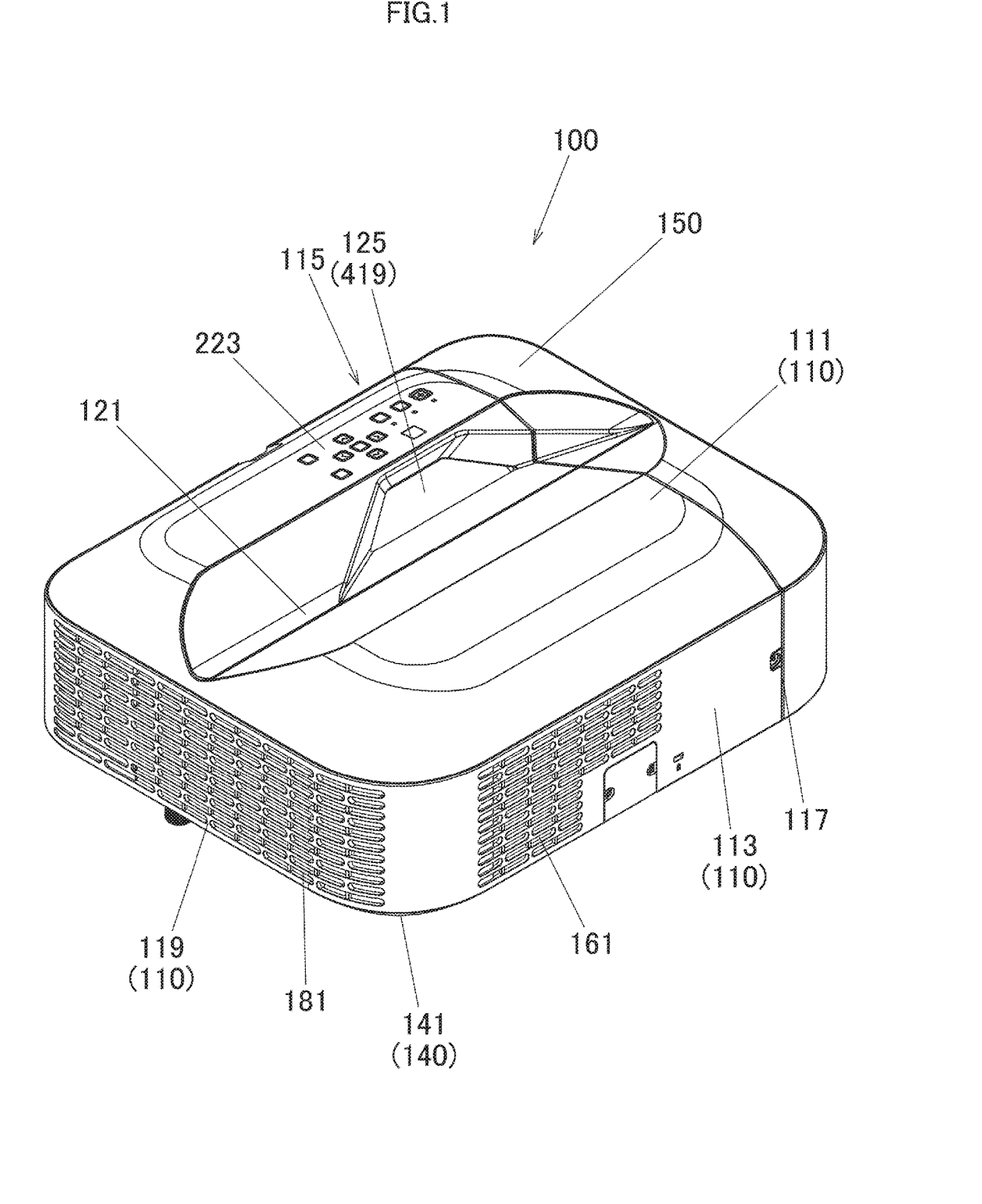
FIG. 1 is an external perspective view of a projector according to a first embodiment of the invention.

Hereinafter, a first embodiment of the invention will be described. FIG. 1 is an external perspective view of a projector 100 according to a first embodiment of the invention. In describing a main body of the projector 100, when left and right are referred to in relation to the main body of the projector 100, they denote, respectively, left and right in relation to a projecting direction of the projector 100, and when front and rear are referred to in relation to the main body of the projector 100, they denote, respectively, front and rear in relation to the projecting direction of the projector 100. In addition, in FIG. 1, a right obliquely downward direction denotes a front of the projector 100.

The projector 100 has a substantially rectangular parallelepiped shape as shown in FIG. 1. The projector 100 is made up of a casing main body formed by an upper case 110 and a lower case 140 and a connector cover 150 which covers a left panel 117 which can be detachably attached to the casing main body. The connector cover 150 is configured to have a recess so as to cover an outer circumferential edge of the left panel 117. Various types of devices and circuit boards on a bottom panel 141 of the lower case 140 are then covered by the upper case 110. The projector 100 of this embodiment has front inside air outlet holes 161 which are formed in a front panel 113 of the upper case 110 and outside air inlet holes 181 which are formed in a right panel 119. The projector 100 also has back outside air inlet holes and a speaker sound emitting hole portion which are formed in a back panel 115.

A keys/indicators unit 223 is provided at a rear portion on an upper panel 111 of the upper case 110. Disposed on this keys/indicators unit 223 are keys and indicators which include a power supply switch key, a projection switch key, a power indicator, an overheat indicator, and the like. The projection switch key switches on or off the projection by the projector 100. The power indicator informs whether a power supply is on or off. The overheat indicator informs of an overheat condition occurring in a light source unit, a display device, a control unit or the like when they really overheat.

A substantially V-shaped cut groove 121 is formed on the upper panel 111 of the upper case 110 so as to extend in a left-and-right or transverse direction thereof from a right side of the casing main body to the connector cover 150 which is provided on a left side of the casing main body. A projection port 125 is formed in the cut groove 121, so that image light can be emitted obliquely to the front from the projection port 125.

Although not shown in the drawings, provided in the left panel 117 are various types of terminals (a group of terminals) such as a video signal input D-SUB terminal into which analog RGB video signals are inputted, an S terminal, an RCA terminal, a voice output terminal, a power supply adaptor and a plug. Outside air inlet holes are also provided in the left panel 117.

Figure 2:
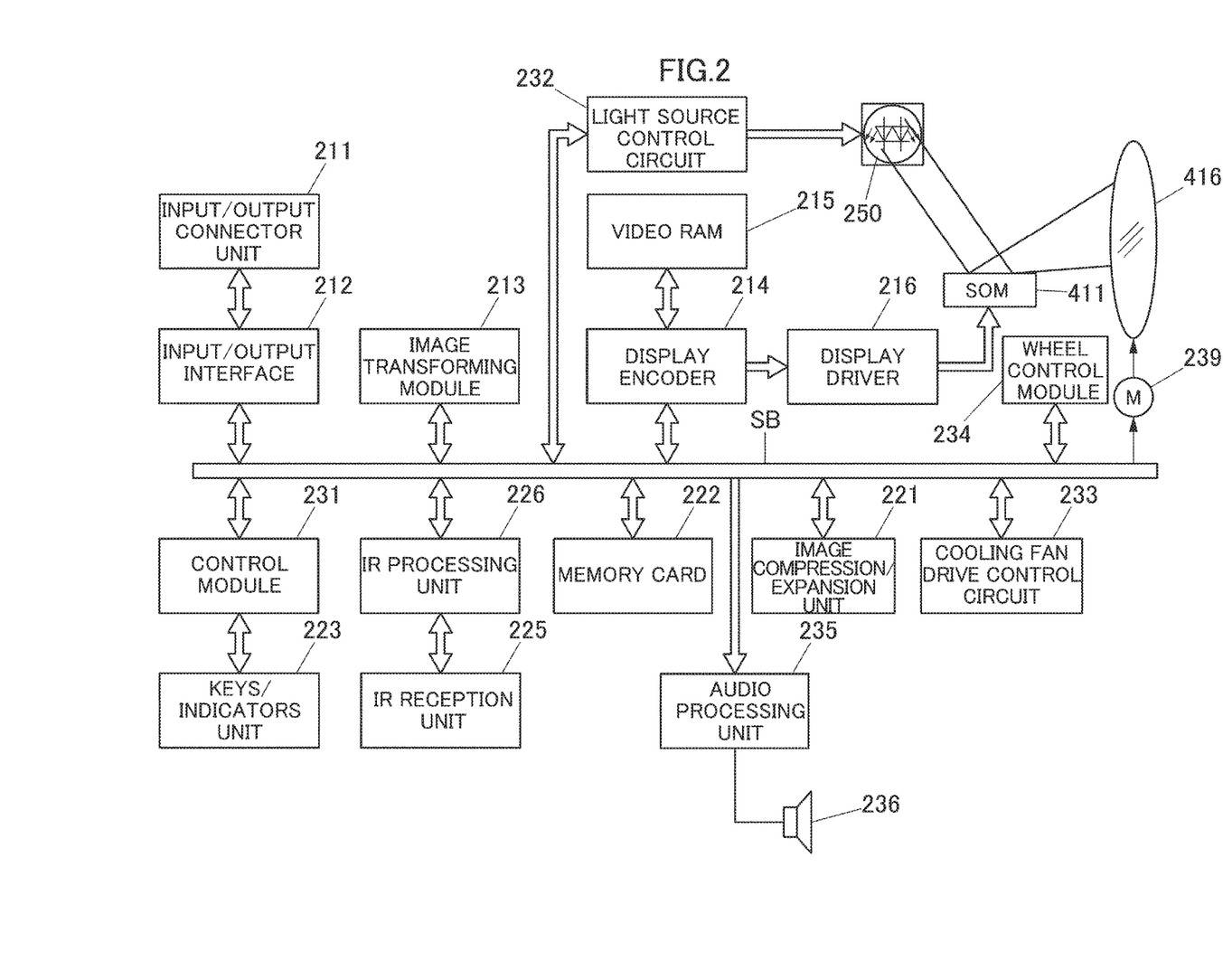
FIG. 2 is a block diagram illustrating functional blocks of the projector according to the first embodiment of the invention.

Next, a projector control unit of the projector 100 will be described by the use of a functional block diagram illustrated in FIG. 2. The projector control unit includes a control module 231, an input/output interface 212, an image transforming module 213, a display encoder 214, a display driver 216 and the like.

Image signals of various standards which are inputted from the input/output connector unit 211 are sent via the input/output interface 212 and a system bus (SB) to the image transforming module 213 where the image signals are transformed so as to be unified into an image signal of a predetermined format which is suitable for display by the projector control unit. Thereafter, the image signals so transformed are outputted to the display encoder 214.

The control module 231 governs the control of respective operations of circuitries within the projector 100 and is made up of a CPU configured as an arithmetic unit, a ROM which stores in a fixed fashion operation programs of various types of settings, a RAM which is used as a working memory and the like.

The display encoder 214 deploys the image signals which have been inputted thereinto on a video RAM 215 for storage therein and generates a video signal from the contents stored in the video RAM 215, outputting the video signal so generated to the display driver 216.

The display driver 216 functions as a display device control module. The display driver 216 drives a display device 411, which is a spatial optical modulator (SOM), at an appropriate frame rate according to the image signal outputted from the display encoder 214.

The projector 100 includes a light source unit 250. The control module 231 controls a light source control circuit 232 which is configured as a light source control unit. The light source control circuit 232 controls not only the emission of light from each of an excitation light shining device 310 and a red light source device 350 of the light source unit 250 but also the rotation of a luminescent plate 331 of a green light source device 330 via a wheel control module 234 so that light source lights of predetermined wavelength ranges which are required in producing an image are emitted from the light source unit 250 (refer to FIG. 3).

In the projector 100, a pencil of light emitted from the light source unit 250 is shone on to the display device 411 to thereby form an optical image using reflected light from the display device 411, and the optical image so formed is then projected on to a screen or the like for display thereon via a projection side optical system.

This projection side optical system has a movable lens group 416, and this movable lens group 416 is driven by a lens motor 239 for zooming or focusing.

When the projector 100 is in a reproducing mode, an image compression/expansion unit 221 reads out image data recorded on a memory card 222 and expands individual pieces of image data which make up a series of dynamic images frame by frame. Then, the image compression/expansion unit 221 outputs the image data to the display encoder 214 via the image transforming module 213 so as to enable the display of dynamic images and the like based on the image data stored on the memory card 222.

Operation signals generated at the keys/indicators unit 223 which is provided on the upper case 110 are sent out directly to the control module 231. Key operation signals from a remote controller are received by an IR reception unit 225, and a code signal demodulated at an IR processing unit 226 is outputted to the control module 231.

An audio processing unit 235 is connected to the control module 231 via the system bus (SB). This audio processing unit 235 includes a circuitry for a sound source such as a PCM sound source or the like. When the projector 100 is in a projection mode and the reproducing mode, the audio processing unit 235 converts audio data into analog signals and drives a speaker 236 to spread loudly sound or voice based on the audio data.

Further, the control module 231 causes a cooling fan drive control circuit 233 to detect temperatures through a plurality of temperature sensors which are provided in the light source unit 250 so as to control the rotating speeds of cooling fans based on the results of the temperature detections. Additionally, the control module 231 also causes the cooling fan drive control circuit 233 to keep the cooling fans rotating by use of a timer even after the power supply to the main body of the projector 100 is switched off. Alternatively, the control module 231 causes the cooling fan drive control circuit 233 to cut off the power supply to the main body of the projector 100 depending upon the results of the temperature detections by the temperature sensors.

Figure 3:
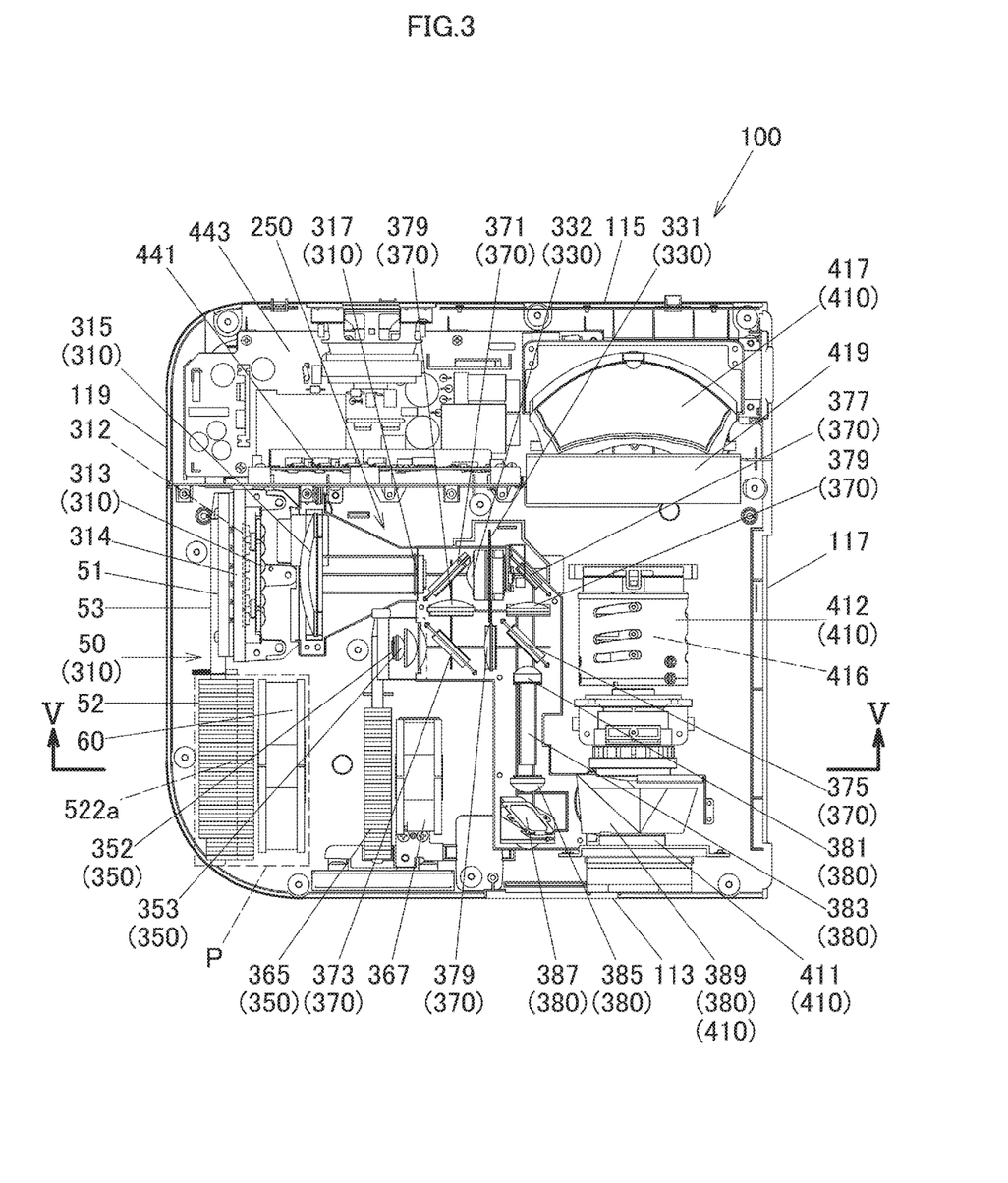
FIG. 3 is a schematic plan view illustrating an internal structure of the projector according to the first embodiment of the invention.

Next, an internal structure of the projector 100 will be described. FIG. 3 is a schematic plan view illustrating an internal structure of the projector 100. The projector 100 includes a main control circuit board 441 and a power supply control circuit board 443 which are provided near the back panel 115.

The light source unit 250 has the green light source device 330 within a light source case. Additionally, the light source unit 250 includes a light guiding optical system 370 and a light source side optical system 380 which function as a light guiding path.

The excitation light shining device 310 is disposed near the right panel 119 within the casing of the projector 100. A plurality of blue laser diodes 312, which are semiconductor light emitting devices, are provided in the excitation light shining device 310. The blue laser diodes 312 are held on a light source holder 314. Collimator lenses 313 are disposed individually on optical axes of the blue laser diodes 312 to convert lights emitted from the blue laser diodes 312 into parallel lights so as to enhance the directivity thereof. In this embodiment, a total of 36 blue laser diodes 312 are disposed into a configuration of six rows and six columns, and a total of 36 collimator lenses 313 are also disposed into a configuration of six rows and six columns.

A collective lens 315 is provided in front of the collimator lenses 313. The collective lens 315 collects lights of a range of blue wavelengths which are emitted from the collimator lenses and guides them on to a diffusion plate 317. The diffusion plate 317 transmits the lights of the range of blue wavelengths which are incident thereon while diffusing them and guides them on to the green light source device 330.

The red light source device 350 includes a red light source 352 and a collective lens group 353. The red light source 352 is a red light emitting diode which is a semiconductor light emitting device for emitting light of a range of red wavelengths. The red light source 352 is disposed so that its optical axis becomes parallel to light emitted from each of the blue laser diodes 312. The collective lens group 353 collects light of the range of red wavelengths emitted from the red light source 352.

A heat sink 365 for the red light source device 350 is disposed on a side of the red light source device 350 which faces the front panel 113, and a heat sink 50 for the excitation light shining device 310 is disposed on a side of the excitation light shining device 310 which faces the front panel 113. A fan 60 is disposed between the heat sink 50 and the heat sink 365. A fan 367 is also disposed on a side of the heat sink 365 which faces the left panel 117. The fans 60, 367 are each an axial-flow fan having a plurality of vanes. The fans 60, 367 of this embodiment draw in outside air for cooling. Namely, inlet air drawn or let in by the fans 60, 367 is let in via the heat sink 50 for the excitation light shining device 310 and the heat sink 365 for the red light source device 350. Thus, the blue laser diodes 312 and the red light source 352 are cooled by the corresponding heat sinks 50, 365.

The luminescent plate 331, which makes up the green light source device 330, is disposed substantially at a center of the projector 100. The luminescent plate 331 has a circular disc shape and is disposed on an optical path of excitation light emitted from the excitation light shining device 310. The luminescent plate 331 is driven to rotate by a motor.

A collective lens group 332 is disposed on a side of the luminescent plate 331 which faces the excitation light shining device 310, and a collective lens (not shown) is also disposed on a side of the luminescent plate 331 which faces a reflection mirror 377 or an opposite side of the luminescent plate 331 to the side thereof which faces the excitation light shining device 310.

The collective lens group 332 collects a pencil of excitation light which is emitted from the excitation light shining device 310 and which passes through a first dichroic mirror 371 on to the luminescent plate 331 and also collects luminous light which is emitted from the luminescent plate 331 in the direction of the excitation light shining device 310.

A luminous light emitting area and a light transmitting area are provided continuously in a circumferential direction in an end-to-end fashion. The luminous light emitting area receives light which is emitted from the excitation light shining device 310 and is then collected on to it via the collective lens group 332 as excitation light and emits luminous light of a range of green wavelengths. The light transmitting area transmits excitation light emitted from the excitation light shining device 310 or transmits excitation light emitted from the excitation light shining device 310 while diffusing it.

A metallic base material made up of copper or aluminum can be used for a base material of the luminescent plate 331. An annular groove is formed on a surface of the base material which faces the excitation light shining device 310. A bottom portion of this groove is mirror finished through silver deposition or the like, and a green luminescent material layer is laid out on the bottom portion. In the light transmitting area, a transparent base material having a light transmitting property is fitted in a cut out through hole portion in the base material. In a case where an area which transmits excitation light while diffusing it is disposed as the light transmitting area, a transparent base material on a surface of which minute irregularities are formed through sandblasting is fitted in the cut out through hole portion.

When light of a range of blue wavelengths which is emitted from the excitation light shining device 310 is shone on to the green luminescent material layer of the luminescent plate 331, a green luminescent material is excited to emit light of the green wavelengths in every direction. The luminous light of the range of green wavelengths which is emitted in a luminescent fashion is emitted towards the right panel 119 to be incident on the collective lens group 332. On the other hand, the light of the range of blue wavelengths emitted from the excitation light shining device 310 which is then incident on the transparent light transmitting area passes through the luminescent plate 331 or passes through the luminescent plate 331 while being diffused and is then incident on the collective lens (not shown) which is disposed on the back side (in other words, the side facing the left panel 117) of the luminescent plate 331.

The light guiding optical system 370 includes collective lenses which collect a pencil of light of the range of blue wavelengths, a pencil of light of the range of red wavelengths and a pencil of light of the range of green wavelengths and reflection mirrors and dichroic mirrors which turn axes of the pencils of light of the blue, red and green wavelength ranges so as to direct them in the same direction. Specifically speaking, the light guiding optical system 370 includes the first dichroic mirror 371, a second dichroic mirror 373, a third dichroic mirror 375, the reflection mirror 377 and a plurality of collective lenses 379.

The first dichroic mirror 371 is disposed between the diffusion plate 317 and the collective lens group 332. The first dichroic mirror 371 transmits light of the range of blue wavelengths and reflects light of the range of green wavelengths. Light of the range of green wavelengths which is emitted from the luminescent plate 331 is reflected by the first dichroic mirror 371 and is guided to the second dichroic mirror 373 by way of the collective lens 379.

The second dichroic mirror 373 is disposed in a position where light of the range of green wavelengths which is emitted from the first dichroic mirror 371 intersects light of the range of red wavelengths which is emitted from the red light source device 350. The second dichroic mirror 373 reflects light of the range of green wavelengths and transmits light of the range of red wavelengths. The light of the range of green wavelengths which is emitted from the first dichroic mirror 371 is reflected by the second dichroic mirror 373 and is then guided to the third dichroic mirror 375 by way of the collective lens 379 which is disposed nearer to the left panel 117 than the second dichroic mirror 273.

Light of the range of red wavelengths which is emitted from the red light source device 350 passes through the second dichroic mirror 373, and an axis of the red light so emitted coincide with an axis of the light of the range of green wavelengths. Thereafter, the light of the range of red wavelengths is guided to the third dichroic mirror 375 by way of the collective lens 379.

On the other hand, in the light of the range of blue wavelengths which is emitted from the excitation light shining device 310 and is diffused by the diffusion plate 317, the light of the range of blue wavelengths which is incident on the light transmitting area of the luminescent plate 331 is reflected by the reflection mirror 377 and is then guided to the third dichroic mirror 375 by way of the collective lens 379.

The third dichroic mirror 375 reflects light of the range of green wavelengths and light of the range of red wavelengths and transmits light of the range of blue wavelengths. Thus, the axis of the light of the range of green wavelengths which is reflected by the second dichroic mirror 373 and the axis of the light of the range of red wavelengths which passes through the second dichroic mirror 373 are reflected by the third dichroic mirror 375 and are then incident on a collective lens 381 of the light source side optical system 380. On the other hand, the light of the range of blue wavelengths which is reflected by the reflection mirror 377 passes through the third dichroic mirror 375 and is then guided to the collective lens 381 of the light source side optical system 380.

In this way, the respective axes of the light of the range of blue wavelengths, the light of the range of red wavelengths and the light of the range of green wavelengths coincide with one another as a result of the blue, red and green lights passing through or being reflected by the third dichroic mirror 375.

The light source side optical system 380 includes the collective lens 381, a light tunnel 383, a collective lens 385, a light shining mirror 387, and a Total Internal Reflection (TIR) prism (a total reflection prism) 389. The TIR prism 389 also makes up part of a projection side optical system 410, which will be described later. The collective lens 381 collects light which is emitted from the third dichroic mirror 375. The light of the range of blue wavelengths, the light of the range of red wavelengths and the light of the range of green wavelengths which are collected by the collective lens 381 are then incident on the light tunnel 383. When the pencils of light are incident on the light tunnel 383, their intensities are distributed uniformly by the light tunnel 383.

The collective lens 385 is disposed on an optical axis of the light tunnel 383 which emerges from an end thereof which faces the front panel 113. The pencils of light emitted from the light tunnel 383 are collected by the collective lens 385 and are then shone on to the light shining mirror 387.

The projection side optical system 410 has the TIR prism 389, the display device 411, a lens barrel 412, and an aspheric mirror 417. The pencils of light which are reflected by the light shining mirror 387 are incident on the TIR prism 389 and are then shone on to an image forming plane of the display device 411 which is disposed on a side of the TIR prism 389 which faces the front panel 113. Image light formed by the display device 411 is shone on to the aspheric mirror 417 by way of a fixed lens group and the movable lens group 416 which are disposed within the lens barrel 412 which is disposed on a side of the TIR prism 389 which faces the back panel 115.

The image light which is reflected by the aspheric mirror 417 is emitted to an exterior portion of the projector 100 by way of a cover glass 419 (also, refer to FIG. 1) and is then projected on to a screen.

By configuring the projector 100 in the way described heretofore, when the luminescent plate 331 rotates and the excitation light shining device 310 and the red light source device 350 emit light at different timings, light of the range of blue wavelengths, light of the range of red wavelengths and light of the range of green wavelengths are incident sequentially on the collective lens 381, the light tunnel 383 and the like of the light source side optical system 380 byway of the light guiding optical system 370 and are then incident on the display device 411. As this occurs, the blue, red and green lights are reflected in a time-sharing fashion according to data displayed by the display device 411, which is a Digital Micromirror Device (DMD), whereby a color image can be projected on to the screen.

Next, a cooling device of the projector 100 will be described. The cooling device includes a heat sink and a fan. In the example illustrated in FIG. 3, the cooling device can be made up of the heat sink 50 and the fan 60 which are illustrated in a portion P.

Figure 4:
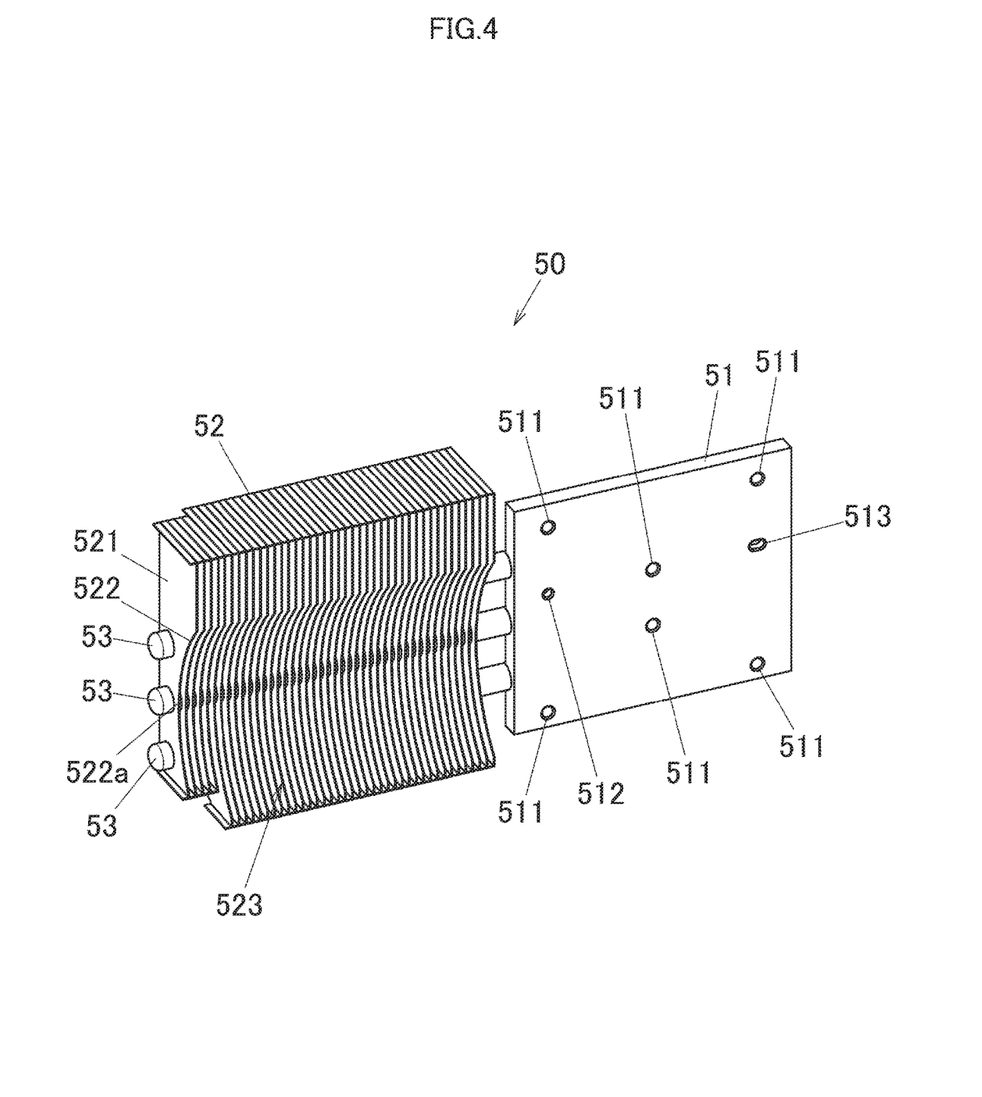
FIG. 4 is a perspective view of a heat sink according to the first embodiment of the invention.

FIG. 4 is a perspective view of the heat sink 50. The heat sink 50 includes a heat transmitting portion 51 and a fin assembly 52. The heat transmitting portion 51 and the fin assembly 52 are connected together by three heat pipes 53.

The heat transmitting portion 51 has a substantially rectangular plate-like shape. The heat transmitting portion 51 has a plurality of threaded holes 511. Additionally, the heat transmitting portion 51 has a circular positioning hole 512 and an elliptic positioning hole 513. The heat transmitting portion 51 is fixed to a light source holder 314 as illustrated in FIG. 3 by these threaded holes 511 and the positioning holes 512, 513. The heat transmitting portion 51 transmits heat generated as a result of driving of the blue laser diodes 312 to the fin assembly 52 by way of the heat pipes 53.

Returning to FIG. 4, the fin assembly 52 has a substantially rectangular plate-like shape as a whole and is formed by connecting a plurality of plate-like fins 521 to the heat pipes 53. Side surfaces of the adjacent fins 521 are substantially parallel to one another. Additionally, the fins 521 are disposed so that the side surfaces thereof become substantially parallel to a rotational axis of a shaft member 64 of the fan 60, which will be described later. The fins 521 are partially cut off and each have a cut off portion 522, which is formed into the shape of a depressed or sagging arc. The fins 521 are formed to have substantially the same radius of curvature and depth. A recess portion 523 is formed on the fin assembly 52 by the cut off portions 522, and the resulting recess portion 523 is depressed into a sagging arc-like groove which extends in a direction in which the heat pipes 53 extend. In this way, the plurality of fins 521 making up the fin assembly 52 all have the same shape at portions which are situated to face the fan 60.

Figure 5:
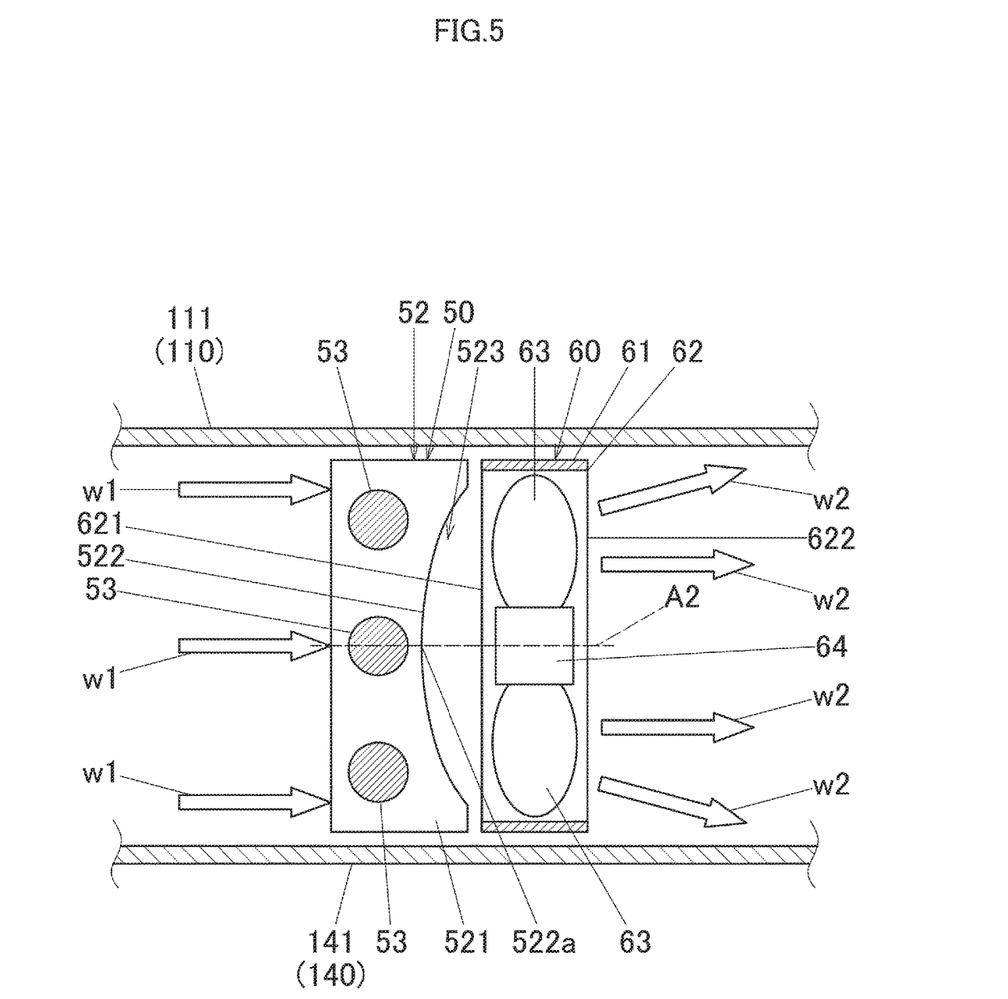
FIG. 5 is a schematic sectional view of a peripheral area of the heat sink and a fan in a portion P of the projector according to the first embodiment of the invention taken along a line V-V illustrated in FIG. 3.

FIG. 5 is a schematic sectional view of a peripheral portion of the heat sink 50 and the fan 60 in the portion P taken along a line V-V illustrated in FIG. 3. The heat sink 50 and the fan 60 are disposed between the upper panel 111 and the bottom panel 141 of the projector 100. The heat sink 50 is disposed on an inlet side of the fan 60 in such a way that the recess portion 523 of the fin assembly 52 is directed to face an inlet port 621 of the fan 60.

The fin assembly 52 has a size which is good enough to cover an opening portion 62 of the fan 60. Bottom portions 522a of the cut off portions 522 of the fin assembly 52 are disposed on a center axis A2 which passes through the shaft member 64 of the fan 60. The central heat pipe 53 of the three heat pipes 53 is also disposed on the center axis A2.

The fan 60 has a case 61 which is formed into the shape of a substantially rectangular frame. The opening portion 62 having a substantially circular shape is provided in the case 61. Vane portions 63 and the shaft member 64 for the vane portions 63 are disposed inside the opening portion 62.

The vane portions 63 are driven to rotate within the opening portion 62 by the shaft member 64. Then, inlet air w1 on an inlet side of the fan 60 is let in through gaps between the fins 521 from an inlet port 621 of the fan 60. Thereafter, the fan 60 expels the inlet air w1 so let in from an outlet port 622 on an outlet side of the fan 60 as outlet air w2.

In the axial-flow fan 60, the directivity of an air flow is sometimes lower at the inlet port 621 on the inlet side than at the outlet port 622 on the outlet side, and the speed of an air flow also sometimes becomes slower at the inlet port 621 on the inlet side than at the outlet port 622 on the outlet side. Due to this, when a member such as the fins 521 are disposed directly near the inlet port 621, the speed of air flows flowing through the gaps between the fins 521 is reduced further by resistance generated in flow paths defined by the gaps. However, in this embodiment, the recess portion 523 is provided on the fin assembly 52, whereby the fins 521 are prevented from lying near the inlet port 621 on the inlet side of the fan 60. This enables the fin assembly 52 to be disposed near the fan 60 while reducing resistance against air flows generated when inlet air w1 is caused to flow through the flow paths defined by the gaps between the fins 521 as a result of driving of the fan 60 to thereby suppress the reduction in speed of the air flows. This can reduce a redundant space within the projector 100, whereby the degree of freedom in layout in the projector 100 can be enhanced, and the size of the projector 100 can be made small.

In this embodiment, the fin assembly 52 and the fan 60 are disposed between the upper panel 111 and the bottom panel 141 while making a space defined therebetween narrower. This reduces a risk of inlet air w1 generated by driving the fan 60 being let into the inlet port 621 byway of an outer circumference of the fin assembly 52, whereby inlet air w1 which contributes to heat dissipation can be guided so as to pass through the gaps between the fins 521.

The recess portion 523 of the fin assembly 52 is formed into the sagging arc-like groove which extends in one direction or the direction in which the heat pipes 53 extend, whereby the cut off portions 522 of the fins 521 have substantially the same shape. This makes it easy to fabricate the fin assembly 52 having the recess portion 523. The fin assembly 52 may be fabricated by using fins 521 which have the same shape.

(Second Embodiment)

Figure 6A:
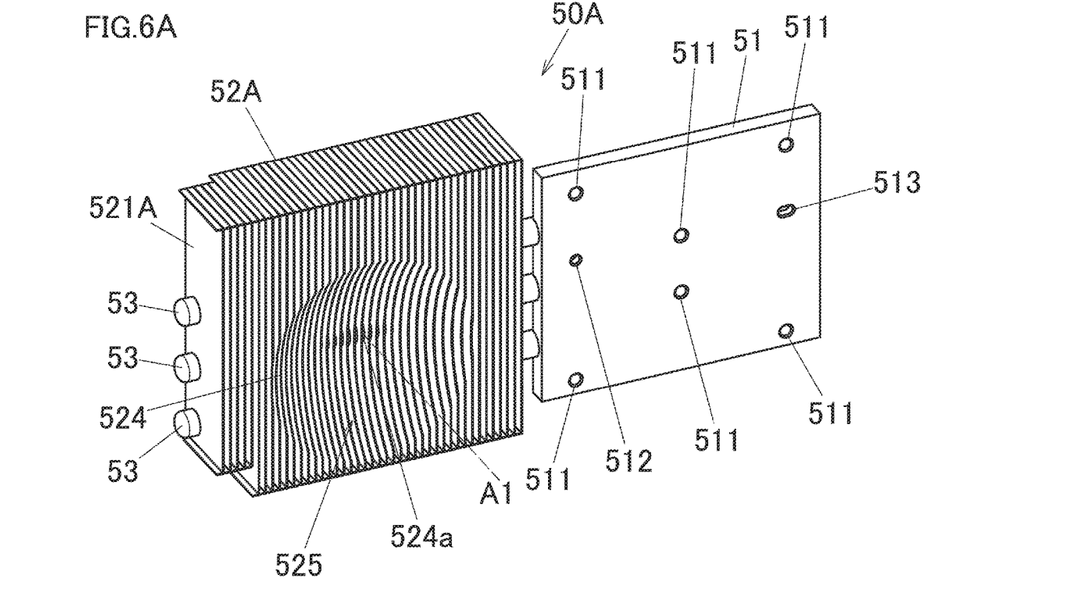
FIG. 6A is a perspective view of a heat sink according to a second embodiment of the invention which has a curvedly sagging recess portion.
Figure 6B:
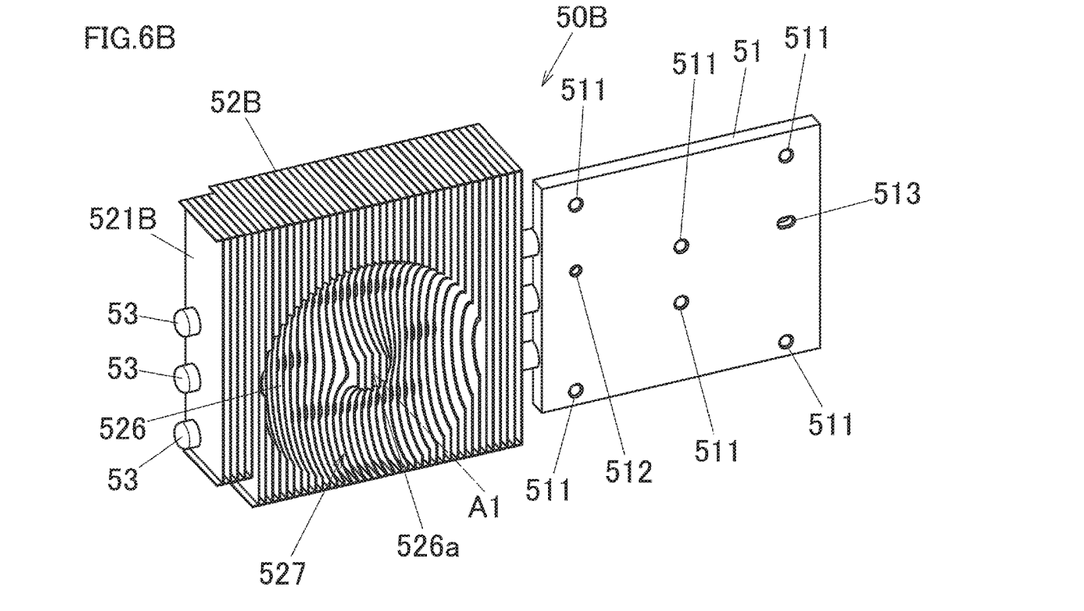
FIG. 6B is a perspective view of a heat sink according a modified example of the second embodiment of the invention which has a donut-like recess portion.

Next, a second embodiment will be described. In this embodiment, fin assemblies 52A, 52B including bowl-like recess portions 525, 527 will be described in place of the recess portion 523 of the first embodiment. FIG. 6A is a perspective view of a heat sink 50A having the recess portion 525 which is a curvedly sagging recess portion. FIG. 6B is a perspective view of a heat sink 50B having the recess portion 527 which is a donut-like recess portion having an island portion at a center thereof. In the following description of the heat sinks 50A, 50B, like reference signs will be given to like configurations to those of the heat sink 50 of the first embodiment, and the description thereof will be omitted or simplified here.

Firstly, the heat sink 50A in FIG. 6A will be described. Cut off portions 524 are formed on some of fins 521A making up the fin assembly 52A. The cut off portions 524 are each formed into the shape of a curvedly sagging arc. Cut off width and depth of each of the cut off portions 524 are made to differ depending upon positions of the fins 521A so that the recess portion 525 is formed on the fin assembly 52A. Thus, the recess portion 525 is formed so as to sag curvedly or into a bowl-like shape.

Figure 7A:
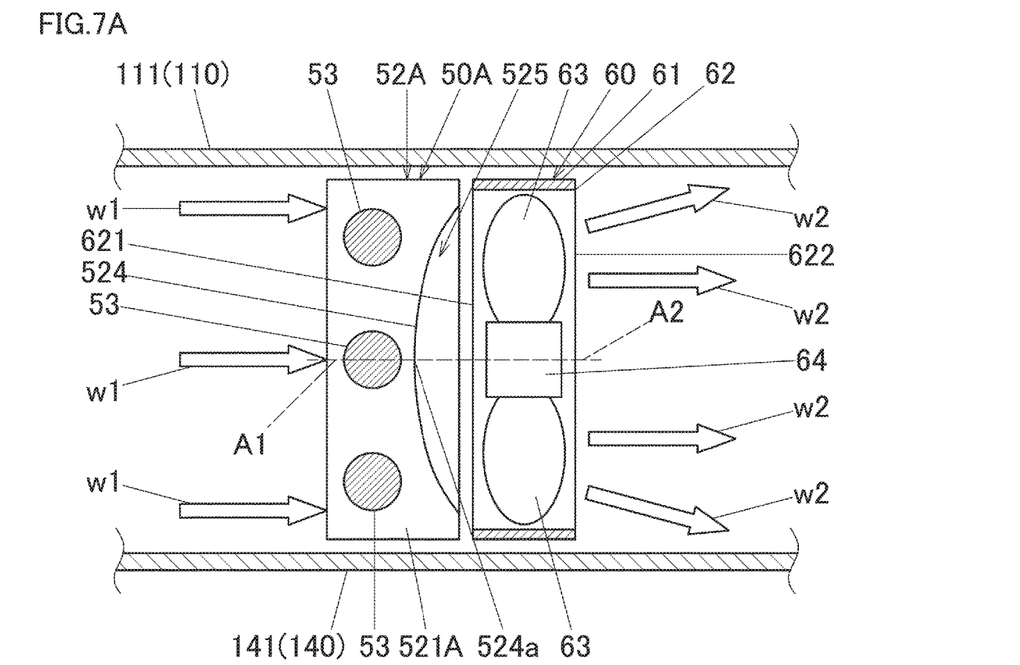
FIG. 7A is a schematic sectional view of a peripheral area of the heat sink according to the second embodiment having the curvedly sagging recess portion and a fan in the portion P of the projector taken along the line V-V illustrated in FIG. 3.

FIG. 7A is a schematic sectional view of a peripheral area of the heat sink 50A and a fan 60 disposed in the portion P taken along the line V-V illustrated in FIG. 3, and in this case, the heat sink 50A replaces the heat sink 50 illustrated in FIG. 3.

As with the first embodiment, the heat sink 50A and the fan 60 are disposed between an upper panel 111 and a bottom panel 141 of a projector 100. The fin assembly 52A of the heat sink 50A is disposed in such a way that the recess portion 525 is directed to face the fan 60.

A center axis A1 which passes through a bottom portion 524a of the recess portion 525 of the fin assembly 52A substantially coincides with a center axis A2 which passes through a shaft member 64 of the fan 60. A central heat pipe 53 of three heat pipes 53 is disposed on the center axis A1.

In the fin assembly 52A of this embodiment, the recess portion 525 is formed near an opening portion 62 of an inlet port 621 on an inlet side of the fan 60, while the recess portion 525 is not formed on a peripheral area of the opening portion 62. This can suppress a reduction in speed of air flows. Further, a total surface area of the fins 521A making up the fin assembly 52A can be increased more than a total surface area of the fins 521 making up the fin assembly 52 of the first embodiment, and thus, the heat sink 50A and the fan 60 can be disposed near to each other while suppressing a reduction in heat dissipating effect.

(Modified Example of Second Embodiment)

Next, the heat sink 50B illustrated in FIG. 6B according to a modified example of the second embodiment will be described. Cut off portions 526 are formed on some of fins 521B making up the fin assembly 52B. A recess portion 527 is formed on the fin assembly 52B by the cut off portions 526. The recess portion 527 has a curvedly sagging bowl-like shape as a whole, and an island portion 526a is formed at a center thereof. In other words, the recess portion 527 is formed so as to sag into a substantially ring- or donut-like recess having an arc-like sagging bottom. Thus, the shapes of the cut off portions 526 are made to differ from one another depending upon positions of the fins 521B. The island portion 526a is formed so that a sectional area becomes narrower at a top portion than at a base portion thereof.

Figure 7B:
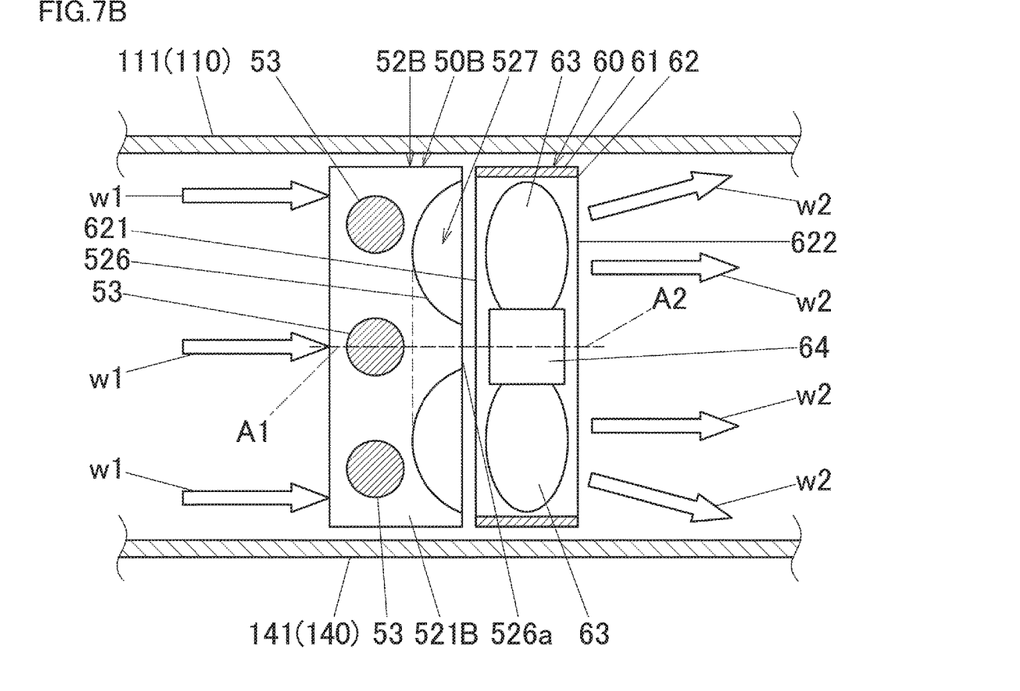
FIG. 7B is a schematic sectional view of a peripheral area of the heat sink according to the modified example of the second embodiment having the donut-like recess portion and a fan in the portion P of the projector taken along the line V-V illustrated in FIG. 3.

FIG. 7B is a schematic sectional view of a peripheral area of the heat sink 50B and a fan 60 in the portion P taken along the line V-V illustrated in FIG. 3, and in this case, the heat sink 50B replaces the heat sink 50 illustrated in FIG. 3.

As with the first embodiment, the heat sink 50B and the fan 60 are disposed between an upper panel 111 and a bottom panel 141 of a projector 100. The fin assembly 52B of the heat sink 50B is disposed in such a way that the recess portion 527 is directed to face the fan 60.

A center axis A1 which passes through a center of the island portion 526a of the recess portion 527 of the fin assembly 52B substantially coincides with a center axis A2 which passes through a shaft member 64 of the fan 60. A central heat pipe 53 of three heat pipes 53 is disposed on the center axis A1.

In the fin assembly 52B of this modified example, the recess portion 527 is formed near an opening portion 62 of an inlet port 621 on an inlet side of the fan 60, while the cut off portions 526 are not provided on a circumference of the recess portion 527. Further, the island portion 526a is provided at a central portion of the recess portion 527 which lies near the shaft member 64. This can not only suppress a reduction in speed of air flows but also increase a surface area of the fins 521B more than the surface area of the fins 521A making up the fin assembly 52A of the second embodiment, whereby the heat sink 50B and the fan 60 can be disposed near to each other while suppressing a reduction in heat dissipating effect.

In the embodiments that have been described heretofore, the fins 521, 521A, 521B may take the form of a pin in place of the plate. As this occurs, too, recess portions to be formed can take similar shapes to those of the recess portions 523, 525, 527.

In the embodiments that have been described heretofore, the fin assemblies 52, 52A, 52B may be disposed on an outlet side of the fan 60 in such a way that the recess portions 523, 525, 527 are directed to face the outlet port 622. As in the case where the fin assemblies 52, 52A, 52B are disposed on the inlet side of the fan 60 in such a way that recess portions 523, 525, 527 are directed to face the inlet port 621, the thickness of the fins 521, 521A, 521B is reduced at the position where the speed of air flows becomes fast to thereby reduce resistance to air flows generated in the flow paths defined by the gaps between the fins 521, 521A, 521B on the outlet side of the fan 60. Thus, the fin assemblies 52, 52A, 52B can be disposed near to the fan 60 while suppressing a reduction in heat dissipating effect.

On the other hand, in the fan 60, the flow path directivity at the inlet port 621 on the inlet side is lower than that at the outlet port 622 on the outlet side, and thus, in a case where the fin assemblies 521, 521A, 521B are disposed near the inlet port 621, inlet air w1 is allowed to pass through the whole of the fins 521, 521A, 521B to thereby reduce irregularity in head dissipation on the fins 521, 521A, 521B.

Thus, the projector 100 according to the embodiments described above includes the axial-flow fan 60 and the heat sink 50, 50A, 50B having the fin assembly 52, 52A, 52B on which the recess portion 523, 525, 527 is formed on the side thereof which faces the fan 60. This allows the fin assembly 52, 52A, 52B and the fan 60 to be disposed near to each other while reducing the risk of the speed of air flows being reduced when the fan 60 is driven to rotate. Thus, it is possible to provide the cooling device in which the space necessary for cooling is reduced, the light source unit including this cooling device, and the projector including the light source unit.

The recess portions 523, 525, 527 are formed by the cut off portions 522, 524, 526 provided on the fins 521, 521A, 521B. Due to this, portions of the fins 521, 521A, 521B which lie near to the periphery of the opening portion 62 and the shaft member 64 are positioned near to the fan 60, while other portions lying near to the opening portion 62 are cut off, whereby the space where the fin assembly 52, 52A, 52B and the fan 60 are disposed can be reduced while suppressing a reduction in cooling performance.

The fins 521, 521A, 521B of the fin assemblies 52, 52A, 52B have the plate-like shape, and the side surfaces of the fins 521, 521A, 521B of the fin assemblies 52, 52A, 52B are disposed parallel to the rotational axis of the fan 60. This causes the fins 521, 521A, 521B to be disposed along the flow path of inlet air w1, thereby making it possible not only to ensure a long heat dissipation time during which heat is dissipated to the inlet air w1 but also to reduce an increase in resistance to air flows in the flow paths.

In the first embodiment, the second embodiment and the modified example of the second embodiment, the fin assemblies 52 52A, 52B are provided on the inlet side of the fan 60. However, the invention is not limited to this configuration. The fin assemblies 52, 52A, 52B may be provided on the outlet side of the fan 60. As this occurs, too, recess portions are formed on sides of the fin assemblies 52, 52A, 52B which face the fan 60. It is desirable that the heat pipes 53 are connected to the fin assemblies 52, 52A, 52B in the position corresponding to the shaft member 64 of the fan 60 and the opposite end positions which are affected less by the flow of air. The shapes of the fin assemblies 52, 52A, 52B are not limited to those described in the first embodiment, the second embodiment and the modified example of the second embodiment and hence can be modified as required according to the wind velocity distribution property of the axial-flow fan 60.

In the first embodiment, the second embodiment, and the modified example of the second embodiment, the fins 521, 521A, 521B which make up the fin assemblies 52, 52A, 52B are disposed so as to be substantially normal to the surfaces of the upper panel 111 and the bottom panel 141. However, the invention is not limited to this configuration. Namely, the side surfaces of the plurality of fins 521, 521A, 521B of the fin assemblies 52, 52A, 52B should be disposed so as to be parallel to the rotational axis of the fan 60. Thus, the side surfaces of the plurality of fins 521, 521A, 521B may be disposed so as to be substantially parallel to the surfaces of the upper panel 111 and the bottom panel 141. Alternatively, the side surfaces of the plurality of fins 521, 521A, 521B may be disposed so as to be inclined by a predetermined angle relative to the surfaces of the upper panel 111 and the bottom panel 141.

While the embodiments of the invention have been described heretofore, these embodiments are presented as examples, and hence, there is no intention to limit the scope of the invention by the embodiments. These novel embodiments can be carried out in other various forms, and various omissions, replacements and modifications can be made without departing from the spirit and scope of the invention. Those resulting embodiments and their modifications are included in the spirit and scope of the invention and are also included in the scope of inventions claimed for patent under claims below and their equivalents.

What is claimed is:

1. A cooling device comprising:
    an axial-flow fan comprising (i) a frame-shaped case having an opening portion formed therein, (ii) a shaft member disposed in the opening portion, and (iii) a plurality of vane portions connected to the shaft member; and
    a heat sink which is positioned to be adjacent to the case of the axial-flow fan in an axial direction of the axial-flow fan, and which includes a fin assembly comprising a plurality of fins,
    wherein the fin assembly has a recess portion in an area of the fin assembly facing the opening portion of the case,
    wherein the fin assembly is shaped such that portions of the plurality of fins that are located in the recess portion face at least the vane portions of the axial-flow fan along the axial direction of the axial-flow fan, and portions of the plurality of fins that are not located in the recess portion face at least the case of the axial-flow fan along the axial direction of the axial-flow fan, and wherein, along the axial direction of the axial-flow fan, the portions of the plurality of fins that are located in the recess portion are spaced apart from the axial-flow fan at a greater distance than the portions of the plurality of fins that are not located in the recess portion.

2. The cooling device according to claim 1, wherein the recess portion is shaped as a groove extending in one direction, and wherein a plurality of the fins making up the fin assembly and positioned in an area facing the axial-flow fan are all identical in shape.

3. The cooling device according to claim 1, wherein the recess portion has a bowl shape which is recessed away from the axial-flow fan.

4. The cooling device according to claim 1, wherein the recess portion has an annular shape which is recessed away from the axial-flow fan.

5. The cooling device according to claim 1, wherein the fin assembly has an island portion at a center of the recess Portion, wherein, along the axial direction of the axial-flow fan, portions of the plurality of fins that located are in the island portion project toward the axial-flow fan with respect to the portions of the plurality of fins that are located in the recess portion, and wherein the island portion faces the shaft member of the axial-flow fan along the axial direction of the axial-flow fan.

6. The cooling device according to claim 1, wherein the fin assembly is disposed on an inlet port side of the axial-flow fan.

7. The cooling device according to claim 2, wherein the fin assembly is disposed on an inlet port side of the axial-flow fan.

8. The cooling device according to claim 3, wherein the fin assembly is disposed on an inlet port side of the axial-flow fan.

9. The cooling device according to claim 4, wherein the fin assembly is disposed on an inlet port side of the axial-flow fan.

10. The cooling device according to claim 5, wherein the fin assembly is disposed on an inlet port side of the axial-flow fan.

11. The cooling device according to claim 1, wherein the recess portion is formed by cut off portions which are provided on the plurality of fins of the fin assembly, and wherein side surfaces of the plurality of fins which lie adjacent to each other are substantially parallel to each other.

12. The cooling device according to claim 2, wherein the recess portion is formed by cut off portions which are provided on the plurality of fins of the fin assembly, and wherein side surfaces of the plurality of fins which lie adjacent to each other are substantially parallel to each other.

13. The cooling device according to claim 3, wherein the recess portion is formed by cut off portions which are provided on the plurality of fins of the fin assembly, and wherein side surfaces of the plurality of fins which lie adjacent to each other are substantially parallel to each other.

14. The cooling device according to claim 4, wherein the recess portion is formed by cut off portions which are provided on the plurality of fins of the fin assembly, and wherein side surfaces of the plurality of fins which lie adjacent to each other are substantially parallel to each other.

15. The cooling device according to claim 5, wherein the recess portion is formed by cut off portions which are provided on the plurality of fins of the fin assembly, and wherein side surfaces of the plurality of fins which lie adjacent to each other are substantially parallel to each other.

16. The cooling device according to claim 6, wherein the recess portion is formed by cut off portions which are provided on the plurality of fins of the fin assembly, and wherein side surfaces of the plurality of fins which lie adjacent to each other are substantially parallel to each other.

17. The cooling device according to claim 7, wherein the recess portion is formed by cut off portions which are provided on the plurality of fins of the fin assembly, and wherein side surfaces of the plurality of fins which lie adjacent to each other are substantially parallel to each other.

18. The cooling device according to claim 1, wherein the plurality of fins of the fin assembly have a plate shape, and wherein side surfaces of the plurality of fins of the fin assembly are disposed substantially parallel to a rotational axis of the axial-flow fan.

19. A light source unit comprising:
the cooling device according to claim 1; and
a light source configured to be connected to the heat sink of the cooling device.

20. A projector comprising:
the light source unit according to claim 19;
a display device on which light source light from the light source unit is shone to form image light;
a projection side optical system configured to project the image light emitted from the display device onto a screen; and
a control unit configured to control the display device and the light source unit.

21. The cooling device according to claim 2, further comprising:
a heat pipe connecting the fin assembly and a heat source,
wherein the one direction in which the groove extends is a direction in which the heat pipe extends.

* * * * *

UNITED STATES PATENT AND TRADEMARK OFFICE
CERTIFICATE OF CORRECTION

PATENT NO. : 10,237,522 B2
APPLICATION NO. : 15/883402
DATED : March 19, 2019
INVENTOR(S) : Tomoyuki Ueda It is certified that error appears in the above-identified patent and that said Letters Patent is hereby corrected as shown below:

Column 13, Line 25, Claim 5, Line 3, delete "Portion," insert --portion,--.

Column 13, Line 27, Claim 5, Line 5, delete "located are" insert --are located--.

Signed and Sealed this
Second Day of July, 2019

Andrei Iancu
*Director of the United States Patent and Trademark Office*